March 29, 1966  P. GILLARD  3,243,374
SOUND-ABSORBING AND SEALING SHEET WITH BITUMINOUS
BASE AND CONTAINING MAGNETIZED PARTICLES
Filed June 3, 1964
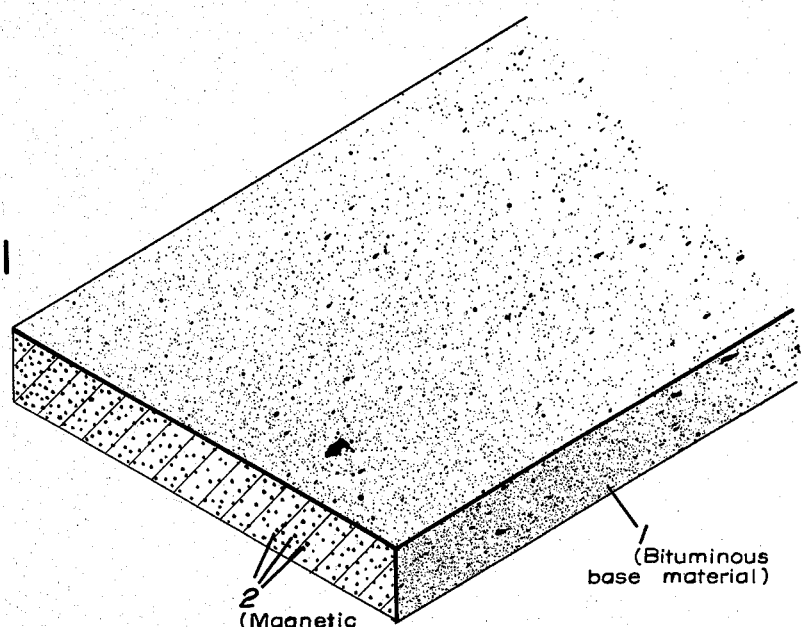
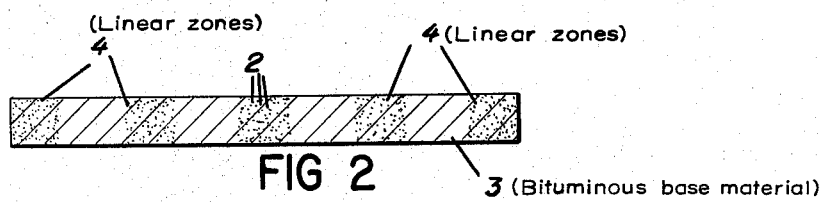
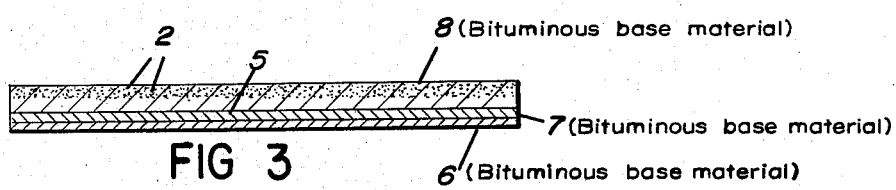
Paul Gillard
INVENTOR
ATTORNEYS

United States Patent Office 3,243,374
Patented Mar. 29, 1966

3,243,374
SOUND-ABSORBING AND SEALING SHEET WITH BITUMINOUS BASE AND CONTAINING MAGNETIZED PARTICLES
Paul Gillard, Pfaffhausen, Zurich, Switzerland, assignor to Matec-Holding A.G., Zug, Switzerland
Filed June 3, 1964, Ser. No. 372,175
Claims priority, application Switzerland, June 6, 1963, 7,100/63
1 Claim. (Cl. 252—62)

The present invention relates to an improved sound-absorbing and sealing material, particularly for the absorption of sound and sealing of thin-walled sheet metal constructions, especially automobile bodies, as well as to an improved method of application of the aforesaid inventive material.

Absorption of sound and sealing of thin-walled sheet metal constructions, in particular automobile bodies, by means of self-adhesive or self-adhering bituminous foils have been greatly improved over the past few years. The meltable foils or sheets employed for this purpose and fabricated by calendering a mixture of bitumen, resins and various fillers have the disadvantage, however, that such sheets can only be applied in horizontal or slightly inclined position. Where the application or melting-on of the sheets is to be effected in conventional furnaces, such as are part of an assembly line, especially in the automobile industry, the sheet metal or foil, however, cannot be located vertically or overhead. In order to apply such sheets or foils to the doors, roofs and trunk compartments of cars for the purpose of sound absorption, it is therefore necessary to provide additional furnaces in which the components of the automobile body can be arranged horizontally in order that the process of melting-on or fusing is effected prior to assembly of the carriage or automobile body. This, however, necessitates considerable investment and requires additional space in the department where the blank parts are assembled. The utilization of a special adhesive is not possible because it would render difficult the wetting of the metal sheets by the binder of the meltable sheet at the instance of melting. As a result, in numerous cases the acoustic efficiency of the system is adversely affected.

It is therefore, an important object of the present invention to provide an improved sound-absorbing and sealing material for thin sheet metal constructions which eliminates the aforementioned disadvantages, as well as to an improved method of application of the aforesaid inventive material.

Generally speaking, the present invention contemplates eliminating these disadvantages by providing sound-absorbing or sealing sheets or foils made from meltable bitumen to which, by the addition of a highly remanent magnetic substance, a temporary adhesive strength on iron or sheet metals is imparted. More specifically, the present invention pertains to a sound-absorbing and sealing material in the form of a foil, sheet, band or the like, manifested by the features that it contains a meltable bituminous base material and a magnetic substance of high remanence. The inventive meltable sheets or ribbons magnetized upon calendering may be positioned upon the metal sheets to be treated and may be melted-on in any desired position, that is, also in vertical or suspended position. It is, therefore, possible to line the carriages or automobile bodies with the aforesaid meltable sheets in the assembled condition and to combine the fusing process with the stoving of the outside lacquers in the stoves or furnaces already existing for such purpose.

The sheets or ribbons according to the present invention may also be employed in combination with other sound-proofing materials (such as felt, cardboard, absorbent cotton, kapok, foam plastics), thus permitting the application of such complex material by the melting process and to dispense with adhesive. Such sandwiched combinations or complexes are simultaneously effective for the insulation, deadening and absorption of sounds.

Additionally, the present invention also permits the solution of numerous sealing problems encountered for example at automobile bodies, in that it is possible, for instance, to apply such magnetic meltable sheets in any position upon welded seams, spot-welded or screwed metal joints, grooves and the like. As they pass through the lacquering stoves the sheets or bands melt and permit obtaining a perfectly water- and dust-proof sealing and a protection against corrosion of the area covered thereby.

In order that the invention may be better understood it is believed desirable at this point to more clearly illustrate what has been said by describing the manner in which the meltable sheets of the present invention are produced and by giving a specific illustrative example.

Hence, the meltable sheets of the present invention are produced as follows:

Bitumen, with or without the addition of elastomers, resins, plasticizers or oils, with or without the admixture of mineral or organic fillers such as wood dust, cork powder, textile fibers, asbestos, kaolin, talc, is mixed in the form of a melt with fillers having the desired magnetic properties. The amount of magnetic powder must be selected such as to obtain a tension which amounts to at least 3 to 5 times the weight of the sheet. This requirement is achieved, in general, by adding 40 to 60 percent by weight of magnetic powder. The resulting mixture is processed by calendering, laminating or extruding in order to form sheets, bands, ribbons, or sausage-shaped articles or the like, to which permanently magnetic properties are imparted in a strong magnetic field. The magnetic poles can be arranged in parallel lines spaced a few millimeters from one another, or they may be disposed in any other geometric configuration.

All of the mineral or inorganic magnetic powders possessing high remanence are suitable for the performance of the present invention. In particular, the following substances may be used successfully: Ferrites of cobalt, barium, strontium and lead, or intercrystalline mixtures thereof, with various inorganic substances added thereto (for example, metal oxides, silicates, etc.) which may improve the magnetic properties of the employed magnetic material. Furthermore, there may be employed various permanently magnetic metal powders, such as for example powders of special steels as are used for the manufacture of permanent magnets.

In accordance with the present invention these magnetic powders or substances can be used, by way of example, in the following manner:

(a) As a powder-like additive to the bituminous material replacing or supplementing other fillers, in amounts of 10 to 70 percent by weight of the bituminous base material and homogeneously distributed in the latter;

(b) As an additive in meltable sheets in the manufacture of layer-like or laminated structures in concentrations of 50 to 80 percent by weight of the bituminous base material; the sheets are then combined with the base mass on that side which later will face the metal to be covered or coated. This can be achieved either by calendering a thin sheet having a high concentration of magnetic powder with a sheet of normal thickness and containing no magnetic additives, or by applying at one side of a normally manufactured, non-magnetic sheet the magnetic powder suspended in a bituminous or some other binder or mixed therewith.

(c) Instead of being uniformly distributed over the whole surface of the meltable sheet the magnetic substances may be oriented, in that for example they may be strongly concentrated in linear or circular zones or areas, in order to obtain strong localized forces of magnetic attraction. This may be accomplished, for example, by adhesively securing magnetic ribbons or bands upon non-magnetic sheets.

The present invention is illustrated by the accompanying drawing in which:

FIG. 1 represents a sheet 1 carrying the magnetic substance 2 homogeneously distributed therein, FIG. 2 represents a cross section of a sheet 3 in which the magnetic substance 2 is concentrated in linear zones 4 in the bituminous base material, and FIG. 3 represents a cross section of a sheet 5 consisting of the layers 6, 7 and 8 of which, e.g., 6 and 7 are comprised of pure bituminous base material, felt or other sound-absorbing materials or the like, while the layer 8 is comprised of a bituminous material carrying the magnetic substance.

The present invention is further illustrated by the following example:

*Example*

A sound-absorbing material according to the present invention is obtained from the following components: 35 percent by weight of bitumen R 85/25 (oxidized bitumen, fusion point at 85° C., penetration=25);

5 percent by weight of butyl-rubber (lower-molecular);
50 percent by weight of barium-ferrite; and
10 percent by weight of asbestos fibers.

The molten bitumen is heated, together with the butyl-rubber to 200° C. for 40 to 60 minutes. The fillers are then homogeneously distributed therein and the mixture is rolled-out into sheets.

It is to be appreciated that the term sheet or sheet-like form as employed herein is to be understood in its broadest sense, therefore also including bands, ribbons, foils or the like.

The foregoing detailed description has been given for clearness of understanding only, and no unnecessary limitations should be understood therefrom, as modifications will be obvious to those skilled in the art.

What is claimed is:

A sound-absorbing and sealing material in sheet-like form consisting essentially of about 35 percent by weight oxidized bitumen having a fusion point at 85° C., 5 percent by weight of low-molecular butyl-rubber, 50 percent by weight of barium-ferrite, and 10 percent by weight asbestos fibers.

References Cited by the Examiner

UNITED STATES PATENTS

| | | | |
|---|---|---|---|
| 1,947,788 | 2/1934 | McIntyre | 181—33 |
| 2,008,655 | 7/1935 | Clarvoe | 181—33 |
| 2,057,251 | 10/1936 | Seigle | 181—33 |
| 2,240,326 | 4/1941 | Burns | 181—33 |
| 2,636,543 | 4/1953 | Groskopf | 252—62 X |
| 2,783,207 | 2/1957 | Tombs | 252—62.5 |
| 3,056,707 | 10/1962 | Helbing et al. | 181—33 |
| 3,078,183 | 2/1963 | Karalus. | |
| 3,112,283 | 11/1963 | Hansen et al. | 260—17.4 |

FOREIGN PATENTS

| | | |
|---|---|---|
| 240,679 | 9/1962 | Australia. |
| 532,453 | 10/1956 | Canada. |
| 570,361 | 2/1959 | Canada. |
| 604,197 | 8/1960 | Canada. |
| 747,737 | 4/1956 | Great Britain. |
| 754,626 | 8/1956 | Great Britain. |

OTHER REFERENCES

Product Engineering (periodical), issue of January 9, 1961, pages 65–68. Copy in Patent Office Scientific Library.

LOUIS J. CAPOZI, *Primary Examiner.*

LEO SIMLOW, R. S. WARD, *Assistant Examiners.*